(12) United States Patent
Kurp

(10) Patent No.: US 6,531,528 B1
(45) Date of Patent: Mar. 11, 2003

(54) READY TO USE SPACKLE/REPAIR PRODUCT CONTAINING DRYNESS INDICATOR

(75) Inventor: Ronald D. Kurp, Bel Air, MD (US)

(73) Assignee: DAP Products Inc., Baltimore, MD (US)

( * ) Notice: Subject to any disclaimer, the term of this patent is extended or adjusted under 35 U.S.C. 154(b) by 0 days.

(21) Appl. No.: 09/980,613

(22) PCT Filed: May 4, 2000

(86) PCT No.: PCT/US00/12147

§ 371 (c)(1),
(2), (4) Date: Apr. 2, 2002

(87) PCT Pub. No.: WO00/66508

PCT Pub. Date: Nov. 9, 2000

Related U.S. Application Data

(60) Provisional application No. 60/132,553, filed on May 5, 1999, and provisional application No. 60/136,175, filed on May 27, 1999.

(51) Int. Cl.⁷ .................................................. C08K 3/00
(52) U.S. Cl. .................. 524/291; 524/323; 524/324
(58) Field of Search ................................. 524/291, 323, 524/324

(56) References Cited

U.S. PATENT DOCUMENTS

| | | | |
|---|---|---|---|
| 3,231,537 A | | 1/1966 | Fisher, Jr. |
| 3,890,156 A | * | 6/1975 | Matsukawa .................. 106/19 |
| 3,891,582 A | | 6/1975 | Desmarais |
| 3,896,965 A | * | 7/1975 | Cornell ........................... 161/1 |
| 4,070,510 A | | 1/1978 | Kahn |
| 4,345,044 A | | 8/1982 | Columbus et al. |
| 4,629,330 A | * | 12/1986 | Nichols ....................... 368/89 |
| 4,657,594 A | | 4/1987 | Struss |
| 4,824,879 A | | 4/1989 | Montgomery et al. |
| 4,954,544 A | | 9/1990 | Chandaria |
| 5,252,246 A | | 10/1993 | Ding et al. |
| 5,258,069 A | | 11/1993 | Knechtel et al. |
| 5,605,259 A | | 2/1997 | Clawson et al. |
| 5,696,298 A | | 12/1997 | Emanuele et al. |
| 5,779,786 A | | 7/1998 | Patel |
| 5,916,816 A | * | 6/1999 | Read ........................... 436/166 |
| 6,335,390 B1 | * | 1/2002 | Seeger ......................... 524/186 |

* cited by examiner

Primary Examiner—Edward J. Cain
(74) Attorney, Agent, or Firm—Wegman, Hessler & Vanderburg

(57) ABSTRACT

A ready to use patch repair product is disclosed that includes a color change indicator therein. After the product has dried the color changes to signal that, if desired, the worker can perform other operations such as painting, sanding, etc on the surface. In one aspect of the invention, a substantially ammonia and ammonium salt free latex polymer is used as the resin binder component. This provides enhanced color stability in the stored product.

18 Claims, No Drawings

READY TO USE SPACKLE/REPAIR PRODUCT CONTAINING DRYNESS INDICATOR

CROSS-REFERENCE TO RELATED APPLICATIONS

Priority filing benefit of (1) International PCT application PCT/US00/12147 filed May 4, 2000, and published under PCT 21(2) in the English language and (2) U.S. provisional application Ser. No. 60/132,553 filed May 4, 1999 and Ser. No. 60/136,175 filed May 27, 1999.

FIELD OF THE INVENTION

The invention relates to a spackling/repair product or powder that produces a color while containing water. After the product is applied and the product dries, the color changes from either red or blue to white.

BACKGROUND OF THE INVENTION

Spackling compounds, joint compounds and patch repair products have been used for years to provide the desired smooth or textured coating over imperfections in building members such as wall board, plaster and other construction surfaces.

Typically. these compounds comprise a resinous binder, limestone, clay, lubricant, stabilizers and thickeners that are mixed with water to provide a paste like product. The paste like product is applied to the desired building member substrate with a trowel or other tool. The product hardens via drying so that the construction worker can then perform other desired operations over the thus hardened product such as sanding, taping, painting, etc.

So as to provide a clear indication to the construction worker that the surface is ready for performance of such additional operations, it is desirable that the spackle, joint compound or repair product contain a color indicator whereby color of the product changes after the applied product has dried.

While the provision of a color change indicator in such a product would superficially appear to be an easy task, the problem is made much more complex by the additional requirement that the product must be color stable during its anticipated inventory or shelf life. Accordingly, there is an even more specific need for a hardenable spackle/repair product that will change color upon drying while exhibiting enhanced color stability during long storage periods.

SUMMARY OF THE INVENTION

In accordance with the invention a ready to use product or powder is provided containing a color change agent that produces a color while containing water. After the product is applied, and the product dries, the color changes, preferably from either red or blue to white.

This product indicates when the applied product has dried. This allows for sanding, painting or re-application at the proper time for maximum performance. All the problems associated with post-application performance due to incomplete drying of the compound can be avoided.

Color change indicators that have been evaluated include phenolphthalein (red) and thymolphthalein (blue). These well-known indicators may change color after an alkaline mixture or solution containing same approaches neutrality. Also indicators can change color when water is lost. Water loss leads to the insolubility and precipitation of indicator solids which are colorless.

One specific formulation that has been tested is as follows:

| RAW MATERIAL | WT % | SAMPLE 2500 Grams |
|---|---|---|
| Pluronic F-68 | 0.1000 | 2.5 |
| Water | 14.0500 | 351.25 |
| Premix then Add | | |
| CMC 7H | 0.2500 | 6.25 |
| Ethylene Glycol | 0.5000 | 12.5 |
| Mix Thoroughly | | |
| UCAR 412 | 6.0000 | 150 |
| Mix Thoroughly | | |
| Vicron 45-3 | 71.2000 | 1780 |
| Mix Thoroughly Premix Then Add | | |
| Water | 4.08975 | 122.4375 |
| Attagel 40 | 1.0000 | 25 |
| Premix Then Add | | |
| Water | 1.5000 | 37.5 |
| 45% KOH | 0.5000 | 12.5 |
| Add | | |
| Phenolphthalein | 0.0025 | 0.0625 |
| W/o Preservative | 0.0000 | 0 |
| | 100.0000 | 2500 |

Pluronic F-68-Polyoxyalkylene glycol block copolymer; available BASF
CMC 7H-Carboxymethylcellulose; available Hercules
UCAR 412-Butyl acrylate/methyl methacrylate/methacrylic acid terpolymer; pH (8–9); available Union Carbide
Vicron 45-3-Ground limestone
Attagel 40-Attapulgus clay; available Engelhardt The product is colored red to pink and turns white upon drying.

The pH of the above formula is preferably about 11–13 to promote enhanced stability of indicator color during the product application.

DETAILED DESCRIPTION OF THE PREFERRED EMBODIMENT

In general, the color change patch repair or joint or spackling compositions comprise surfactant, water retained agent, free-thaw agent, resin binder, pigment, filters, pH adjustment agent and the desired color change indicator. As used throughout these compositions are referred to generically as "patch repair" compounds.

As to the surfactants that can be used, these can be chosen from a variety of commercially available compounds. These include the ethoxylated alkyl phenols, such as the Triton® products available from Union Carbide, the Tamol® products available from Rohm & Haas and the polyoxyalkylene glycol block polymers available for example from BASF.

The water retaining agent or thickener is preferably a cellulosic ether such as carboxymethylcellulose CMC, hydroxyethylmethylcellulose (HEC), hydroxypropylmethylcellulose, alkali swellable and/or associative thickeners, etc. All of these are commercially available. The preferred thickeners are available from Aqualon, Wilmington Del. with the CMC 7H and Natrosol products particularly preferred.

The freeze thaw agent is normally ethylene glycol, although glycols in general can be mentioned.

The resinous binder component can be chosen from the groups of (I) polyvinyl esters and polymers derived therefrom and/or (II) acrylic resin binders. Exemplary binders falling within the designation (I) include poly(vinyl acetate), poly(vinyl alcohol); polyvinyl (butyral); poly(vinyl chloride) etc.

Exemplary binders falling within the group (II) designation include acrylic polymers and copolymers. Usually, these contain copolymerized acrylic unsaturated monomers preferably copolymerized with other ethylenically unsaturated monomers. Acrylic unsaturated monomers include lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxy alkyl acrylates and methacrylates such as hydroxyethyl and hydroxypropyl acrylates and methacrylates, as well as amino acrylates and methacrylates.

The acrylic monomers are preferably copolymerized with ethylenically unsaturated monomers other than acrylic monomers. Ethylenically unsaturated monomers other than said acrylic unsaturated monomers can include, for example, those monomeric materials exhibiting ethylenic double bond unsaturation such as polymerizable vinyl, allylic, fumaric, maleic, or like ethylenically unsaturated double bond functionality (carbon-to-carbon unsaturation) which can be copolymerized with the acrylic double bond unsaturation in said acrylic unsaturated monomers.

Ethylenically unsaturated monomers can include, for example, styrene alpha-methyl styrene and substituted alkyl styrenes, chlorostyrene, vinyl toluene, vinyl naphthalene, dibutyl maleate, butadiene, vinyl chloride, vinylidene chloride, acrylamide and acrylonitrile and similar ethylenically unsaturated monomers. The ethylenically unsaturated monomers can be copolymerized with said monomers containing acrylic unsaturation by free radical induced addition polymerization using peroxy or azo catalysts, common redox catalysts, ultraviolet radiation, or the like. The acrylic copolymer of this invention can be synthesized by adding a monomer mixture over a period of time to an aqueous polymerization medium in the presence of a free radical initiator or azo catalyst to produce an acrylic latex copolymer. Ordinarily about 1–2% peroxide initiators based on the monomer weight is used in the polymerization of monomers.

At present, and in order to impact enhanced color stability to the product, it is preferred to use a resin binder latex that has substantially no $NH_3$ or ammonium salts contained in the latex. Most preferred is UCAR latex 412 which includes as the main polymeric component:

butyl acrylate(BA)/methyl methacrylate (MMA)/methacrylic acid (MA) polymer.

The BA repeat unit may be present in a molar amount of about 40–60% with the MMA present in an amount of about 40–60% and the MA present in an amount of about 0–5%. This particular latex comprises about 45 wt % polymer solids and water in an amount of about 53 wt %. In addition, it contains minor amounts of preservative, an anti-foam agent, anionic stabilizers and residues from free radical initiators. No ammonia or ammonium salts are used in the manufacture of this product. A nonylphenoxy poly(ethyleneoxyl)ethanol surfactant is reputedly present in this latex product in an amount of about 2 wt %.

Referring next to the pigments, these can be chosen from a variety of compounds including ground limestone, $TiO_2$, satin white, etc.

Fillers such as fibers, glossy spheres, pearlites, vermiculites, talc, clays, etc., can also be added.

PH adjustment agents such as NaOH, KOH, $K_2CO_3$ and other bases can be used to regulate pH of the product to preferably, alkalinity.

Exemplary color change agents include phenolpthalein (reddish pink) (PTL) and thymolphthalein (blue) as set forth above. Additionally, ortho-cresolphthalein (red), ethyl bis(2,4-dinitrophenyl)acetate (blue-green), p-nitrophenol (yellow), m-nitrophenol (yellow), m-dinitrophenyl (yellow), 1,2,5-trinitrophenol (orange), and 2,4,6-trinitrophenol (orange) may be mentioned. These color indicators possess color when maintained at an alkaline pH then lose color upon drying of the product.

| Exemplary compositions are as follows: | |
|---|---|
| surfactant | 0–10% |
| thickeners | 0–10% |
| freeze-thaw | 0–10% |
| resin binder | 1–50% |
| pigments | 1–80% |
| water | 10–50% |
| fillers | 0–80% |
| pH adjustment agent | .01–10% |
| color change indicator | 0.00001–10% |
| (The foregoing add up to 100 wt %) | |
| Preferred compositions are as follows: | |
| surfactant | .05–5.0% |
| thickeners | .1–5.0% |
| freeze-thaw | .1–2.0% |
| resin binder | 1–50.00% |
| pigments | 40–80.00% |
| water | 15–40.00% |
| fillers | 1–20% |
| pH adjustment agent | .25–5% |
| color change indicator | .001–5% |
| (The foregoing add up to 100 wt %) | |

The compositions most preferred at this time (i.e., best mode) is as follows:

| | |
|---|---|
| water | 18.48 wt % |
| surfactant | |
| Tamol 850 | 0.57 wt % |
| Pluronic F68 | 0.21 wt % |
| clay | |
| attagel 40 | 1.92 wt % |
| calcium carbonate | |
| microwhite 100 | 42.14 wt % |
| vicron 45-3 | 20.73 wt % |
| thickeners | |
| CMC 7H | 0.06 wt % |
| Natrosol 250* | 0.13 wt % |
| pH adjustment cmpd. | |
| $K_2CO_3$ (45%) | 0.34 wt % |
| freeze-thaw | |
| ethylene glycol | 0.99 wt % |
| color indicator | |
| PTL | 0.02 wt % |

* -modified hydroxylethylcellulose—Aqualon Div. Hercules
pH=11.8–12.8; density 14.8–15.00 lbs/gal; color=pink In accordance with the invention, the artisan applies the repair composition to the requisite structural surface and, with the aid of a trowel or other tool, provides a smooth or textured surface. As applied, the product is in its colored (e.g. pink when PTL is used as the color indicator) state.

Upon drying, the color changes to white thereby indicating to the artisan that additional treatments etc. may be performed on the thus treated surface.

The invention will be further described in the following illustrative examples which are not to be construed to limit the invention.

In the examples the following product identifications are used, in addition to those reported above.

U CAR 353—Union Carbide; vinyl acetate/butylacrylate latex

U CAR 413—Union Carbide; butyl acrylate/methyl methacrylate methacrylic acid latex

EXAMPLES

In order to assess the color stability of the spackling/repair product of the invention, the following tasks were conducted.

Example 1

A spackle formulation including UCAR 353, and phenolphthalein (PTL), as the color change indicator, was prepared. The formulation had the following major ingredients (all ingredients reported in gram units):

| Pluronic F-68 | 0.30 |
| water | 63.58 |
| U CAR 353 | 19.2 |
| Ethylene glycol | 1.5 |
| attagel 40 | 3.0 |
| PTL | 0.03 |
| KOH (45%) | 1.5 |
| Vicron 45-3 | 210 |

Initially the pH of the mixture was about 12.68 but dropped to an unacceptable level of 9.57 within 1 day.

Example 2

Another product having the following formulation was prepared:

| Pluronic F-68 | 2.5 grams |
| CMC 7-H | 6.25 grams |
| water | 511.19 grams |
| ethylene glycol | 12.5 grams |
| U CAR 413 | 150 grams |
| Vicron 45-3 | 1780 grams |
| attagel 40 | 25 grams |
| KOH (45%) | 12.5 grams |
| PTL | 0.0625 grams |

The initial color of the product was pinkish but after about 4 weeks storage of the product at 120° F. in a closed container, the color substantially faded.

Example 3

In an attempt to maintain the desired color level, the amount of PTL in the formulation was increased:

The formulation was as follows:

| U CAR 413 | 106 grams |
| water | 281.8 grams |
| Pluronic F-68 | 2.5 grams |
| Ethylene glycol | 15.00 grams |
| attagel 40 | 25.00 grams |
| Vicron 45-3 | 1110.00 grams |
| CMC 7H | 2.1 grams |
| KOH (45%) | 4.4 grams |
| PTL | 0.25 grams |

Initially, the product had a very bright pink appearance and a pH of 11.01. About 5½ weeks after storage at 120° F., rapid dissipation of the color was noted.

Example 4

In another attempt to enhance color stability of the product, the amount of the KOH (pH regulator) in the formulation was increased. The following composition was prepared:

| water | 240 grams |
| ethylene glycol | 15 grams |
| CMC 7H | 2.1 grams |
| Vicron 45-3 | 1,110.00 grams |
| U CAR 413 | 106 grams |
| Pluronic F-68 | 2.50 grams |
| attagel 40 | 20.00 grams |
| KOH (45%) | 6.2 grams |
| PTL | 0.25 grams |

The initial pH of the product increased to a pH of greater than 12. After 5½ weeks storage at 120° F. the color had faded to about 45–50% of its original intensity.

Example 5

To inhibit color fading, an ammonia free polymer was used as the resin binder. This polymer was given the original designation U CAR 413 "ammonia free" but has now been reclassified as U CAR 412. The previously available U CAR 413 had been synthesized to include a small amount (up to about 1 wt %) of $NH_4OH$ to raise the product pH. The manufacturer has indicated that the U CAR 412 manufacturing process now eliminates this step hence the latex polymer is referred to as "substantially ammonia free." Reference to ammonia free in this context means free of $NH_3$ and/or any of its ammonium salt forms. This phrase shall denote polymer latexes having less than about 0.5 wt % of $NH_3$ or $NH_4$ salt in the latex.

This new formulation included the following:

| water | 240 grams |
| CMC 7H | 15 grams |
| Vicron 45.3 | 1,110.00 grams |
| U CAR 412 | 106 grams |
| (No $NH_4OH$) | |
| Pluronic F 68 | 2.5 grams |
| attagel 40 | 25.00 grams |
| KOH (45%) | 4.40 grams |
| PTL | 0.25 grams |

The product was bright pink and exhibited excellent color uniformity. It dried within 1–1½ hours after being placed over a plurality of small hammer dents.

The initial pH of the product was 11.1. After 7 weeks storage at 120° F. the product surprisingly retained 85–90% of its original depth of pink color. The viscosity of the product was also stable.

Example 6

An additional batch of the U CAR 412 (NH3 or $NH_4OH$) was obtained from the manufacturer. This latex, as received, had a pH of 8.85. (The manufacturer indicated that an amine biocide was incorporated into the latex and this most probably resulted in the higher latex polymer pH). Spackling compositions incorporating this polymer latex and the other ingredients as given in Example 5 above were made. Initial pH of the product was 11.38. No significant change from the original pink color could be detected after 6 weeks storage at 120° F.

Discussion of Results

Improvement in product color stability was observed after changing to a substantially ammonia free latex polymer. This is counterintuitive since PTL is known to provide a pink to red color in alkaline media with a change to colorless at a neutral pH. Quite obviously, one would think that the presence of $NH_3$ in the polymer latex would elevate product pH thereby leading to increased color stability.

While the above description and examples describe specific embodiments of the invention, these are not intended to limit the scope of the invention. The invention is intended to cover equivalents and modifications of those disclosed, specific embodiments.

What is claimed is:

1. Patch repair composition comprising resin binder, pigment, and a pH color change indicator, said composition further having a pH of about 11–13.

2. Patch repair composition comprising 0–10 wt % surfactant, 0–10 wt % thickener, 0–10 wt % freeze thaw agent, 1–50 wt % resin binder, 1–80 wt % pigment, about 10 to about 50% water, about 0–80 wt % filler, about 0.1–10 wt % pH adjustment agent; and a pH color change indicator present in an amount of 0.00001–10%; with the foregoing percentages adding up to 100 wt %.

3. Patch repair composition comprising resin binder, pigment and a pH color change indicator, said resin binder comprising an ammonia and ammonium salt free polymer latex, said composition further having a pH of about 11–13.

4. Patch repair composition comprising 0.05–5.0 wt % surfactant, 0.1–5.0 wt % thickener, 0.1–2.0 wt % freeze-thaw agent, 1–50 wt % resin binder, 40–80 wt % pigment, 15–40 wt % water, 1–20 wt % filler, 0.25–5 wt % pH adjustment agent and about 0.001–5 wt % pH color change indicator with the foregoing percentages adding up to 100 wt %.

5. In a patch repair composition comprising resin binder and pigment, the improvement wherein said resin binder comprises a member selected from (I) polyvinylesters and derivatives of said polyvinylesters and (II) acrylic resin binders, said resin binder being in latex form and having substantially no $NH_3$ or ammonium salts in said latex; said composition further having a pH of about 11–13 and comprising a pH color change indicator possessing color when maintained at an alkaline pH and losing color upon drying of said composition.

6. Composition as recited in claim 5 wherein said resin binder is an acrylic resin binder and said pH color change indicator comprises a member selected from the group consisting of ortho-cresolphthalein; ethyl bis(2,4-dinitrophenyl)acetate; p-nitrophenol; -nitrophenol; m-dinitrophenol; 1,3,5-trinitrophenol; 2,4,6-trinitrophenol; phenolpthalein (PTL); and thymolphthalein.

7. Composition as recited in claim 6 wherein said resin binder comprises as a polymer component a copolymer comprising butyl acrylate and methyl methacylate repeat units.

8. Composition as recited in claim 7 wherein said copolymer further comprises methacrylic acid repeat units.

9. Composition as recited in claim 6 wherein said resin binder comprises as a polymeric component butyl acrylate (BA)/methyl methacrylate (MMA)/methacrylic acid (MA) repeat units; said BA present in a molar amount of about 40–60%, said MMA present in a molar amount of about 40–60%, and said MA present in a molar amount of about 0–5%, based on the total amount of said polymeric component.

10. Composition as recited in claim 6 wherein said color change indicator comprises PTL.

11. A method of treating imperfections and the like existing in building member surfaces comprising:

applying to said surface an amount effective for the purpose of an aqueous patch repair composition comprising, resin binder, pigment, and a pH color change indicator, said aqueous patch repair composition possessing color when applied; and allowing said composition to dry whereby said color dissipates from said composition.

12. A method as recited in claim 11 wherein said aqueous patch repair composition has a basic pH when applied.

13. A method as recited in claim 12 wherein said aqueous patch repair composition comprises as its resin binder a member selected from (I) polyvinyl esters and derivatives of said polyvinyl esters and (II) acrylic resin binders, and wherein said resin binder is in latex form with substantially no $NH_3$ or ammonium salts in said latex.

14. A method as recited in claim 13 wherein said pH color change indicator comprises a member selected from the group consisting of ortho-cresolphthalein; ethyl bis(2,4-dinitrophenyl)acetate; p-nitrophenol; m-nitrophenol; m-dinitrophenol; 1,3,5-trinitrophenol; 2,4,6-trinitrophenol; phenolpthalein (PTL); and thymolphthalein, said aqueous patch repair composition further having a pH of about 11–13.

15. A method as recited in claim 13 wherein said resin binder is an acrylic resin binder (II) comprising as a polymer component a copolymer comprising butyl acrylate and methyl methacrylate repeat units.

16. A method as recited in claim 15 wherein said copolymer further comprises methacrylic acid repeat units.

17. A method as recited in claim 16 wherein said resin binder comprises as a polymeric component butyl acrylate (BA)/methyl methacrylate (MMA)/methacrylic acid (MA) repeat units; said BA present in a molar amount of about 40–60%, said MMA present in a molar amount of about 40–60%, and said MA present in a molar amount of about 0–5%, based on the total moles of repeat units present in said polymeric component.

18. A method as recited in claim 17 wherein said pH color change indicator comprises PTL.

* * * * *